United States Patent
Keroe et al.

(10) Patent No.: US 7,633,300 B2
(45) Date of Patent: Dec. 15, 2009

(54) METHOD FOR USING TOUCH SIGNALS AND A TOUCH UNIT

(75) Inventors: Nikolaus Keroe, Perchtoldsdorf (AT); Gerhard Taeubl, Vienna (AT)

(73) Assignee: Frequentis GmbH, Vienna (AT)

( * ) Notice: Subject to any disclaimer, the term of this patent is extended or adjusted under 35 U.S.C. 154(b) by 63 days.

(21) Appl. No.: 11/512,748

(22) Filed: Aug. 29, 2006

(65) Prior Publication Data

US 2007/0085553 A1    Apr. 19, 2007

(30) Foreign Application Priority Data

Aug. 29, 2005    (AT) .............................. A1413/2005

(51) Int. Cl.
*G01R 27/26*    (2006.01)
*G06F 3/041*    (2006.01)

(52) U.S. Cl. ..................... 324/658; 324/663; 345/173
(58) Field of Classification Search ................ 324/658; 345/173
See application file for complete search history.

(56) References Cited

U.S. PATENT DOCUMENTS

2002/0196036 A1*    12/2002    Toyoshima et al. ......... 324/702
2003/0063073 A1*    4/2003    Geaghan et al. ............. 345/173

* cited by examiner

*Primary Examiner*—Jeff Natalini
(74) *Attorney, Agent, or Firm*—Townsend and Townsend and Crew, LLP

(57) ABSTRACT

A method for evaluating touch signals on a touch unit which has two resistance foils (1, 2). The current (IX, IY) resulting from applying a given measurement voltage (UX, UY) to at least one of the resistance foils (1, 2) is measured and stored as a desired current value (IXS, IYS). Especially after the presence of at least one touch has been confirmed, the actual current (IX<IY) flowing in the other resistance foil (1, 2) is measured when the test voltage is again applied to at least one of the resistance foils (1, 2), and it is compared with the previously established desired current value (IXS, IYS) for this resistance foil (1, 2). In the event that the actual current (IX, IY) measured in the at least one resistance foil (1, 2) exceeds the desired current value (IXS, IYS), it is judged that a double touch occurred (FIG. 8).

10 Claims, 4 Drawing Sheets

METHOD FOR USING TOUCH SIGNALS AND A TOUCH UNIT

RELATED APPLICATIONS

This application claims the priority of Austrian patent application A 1413/2005 filed Aug. 29, 2005, the disclosure of which is incorporated herein by reference as if the application were set forth herein in full.

BACKGROUND OF THE INVENTION

This application concerns a method according to the preamble of claim 1 and a touch unit according to the preamble of claim 5.

U.S. published patent applications 2004/0090431 and 2003/0063073 disclose method and apparatus for detecting double touches.

It is an object of the present invention to determine the presence of a double touch on touch-sensitive units in an exact and unequivocal manner with technologically relatively low efforts. The required switching and electrical layout should be as simple as possible, of low cost, and should securely and reliably operate. It is, however, important that the presence of a double touch be quickly and unambiguously recognized.

SUMMARY OF THE INVENTION

The objectives of the present invention are attained with a method of the above-summarized type which has the distinguishing features of claim 1. A touch unit made in accordance with the present invention has the distinguishing characteristics set forth in claim 5.

The invention will be further described with reference to the drawings.

DESCRIPTION OF THE PREFERRED EMBODIMENTS

Figure 1:
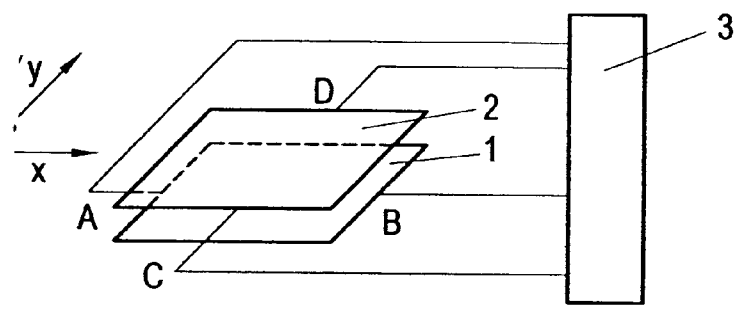
FIG. 1 shows a touch unit with two spaced-apart resistance foils and an evaluation unit.

FIG. 1 schematically illustrates the basic configuration of a touch unit. Such a touch unit has two preferably transparent resistance foils 1, 2 which are spaced apart from each other. Opposing end zones of resistance foils 1, 2 have contacts for applying a measuring voltage to foils 1, 2. Resistance foil 1 has contacts A and B and is used for defining the X-direction; the other resistance foil 2 has contacts C and D and is used for defining the Y-direction. The contacts are connected to a control and evaluation unit 3 for applying given voltage values to contacts A, B and C, D, respectively, at corresponding, given points in time. The control and evaluation unit 3 also measures at the appropriate times the voltages that are generated at the contacts to which no voltage was applied with the help of a voltage-current measuring unit.

Figure 2:
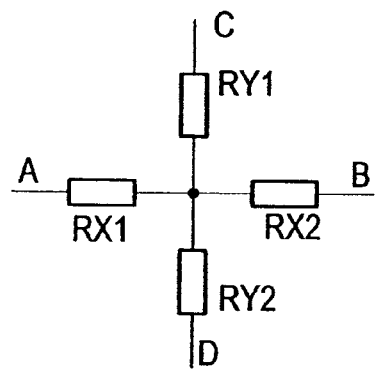
FIG. 2 is a corresponding electrical circuit diagram.

When a touch is applied, the circuit diagram of FIG. 2 becomes active. When a voltage is alternatingly applied to contacts A, B and C, D, the X-Y position of the touch can be determined by measuring the voltages:

If a measuring voltage is applied in the X-direction, for example +5V at point A and 0V at point B, a voltage drop takes place at the X-positions between C and D from +5V to 0V in accordance with the following equation:

$$Xpos = 5V \cdot RX2/(RX1+RX2)$$

The same applies to the Y-direction provided a measuring voltage is applied, for example +5V at point C and 0V at point D, and the voltage at points A or B is measured:

$$Ypos = 5V \cdot RY2/(RY1+RY2)$$

Figure 3:
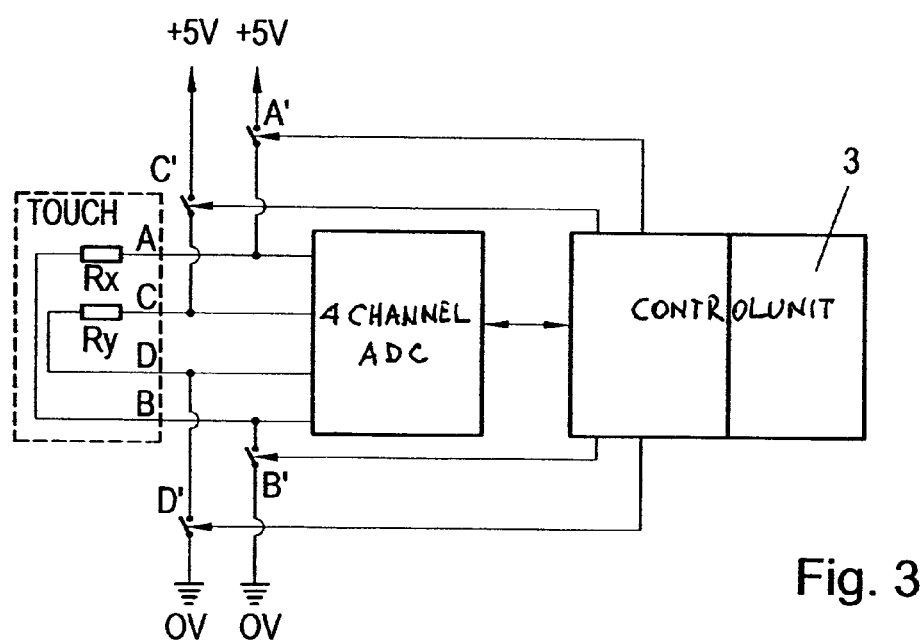
FIG. 3 is a schematic circuit diagram for determining the occurrence of a touch.

Referring to FIG. 3, the control and measurement unit 3 applies corresponding measurement voltages to contacts A, B or C and D, and it can measure the actual voltages that are generated at these points. The voltages are applied and electrical connections to control unit 3 are established for contact points A, B and C, D, respectively, by corresponding control switches A', B', C', D' which are activated by control unit 3.

Figure 4:
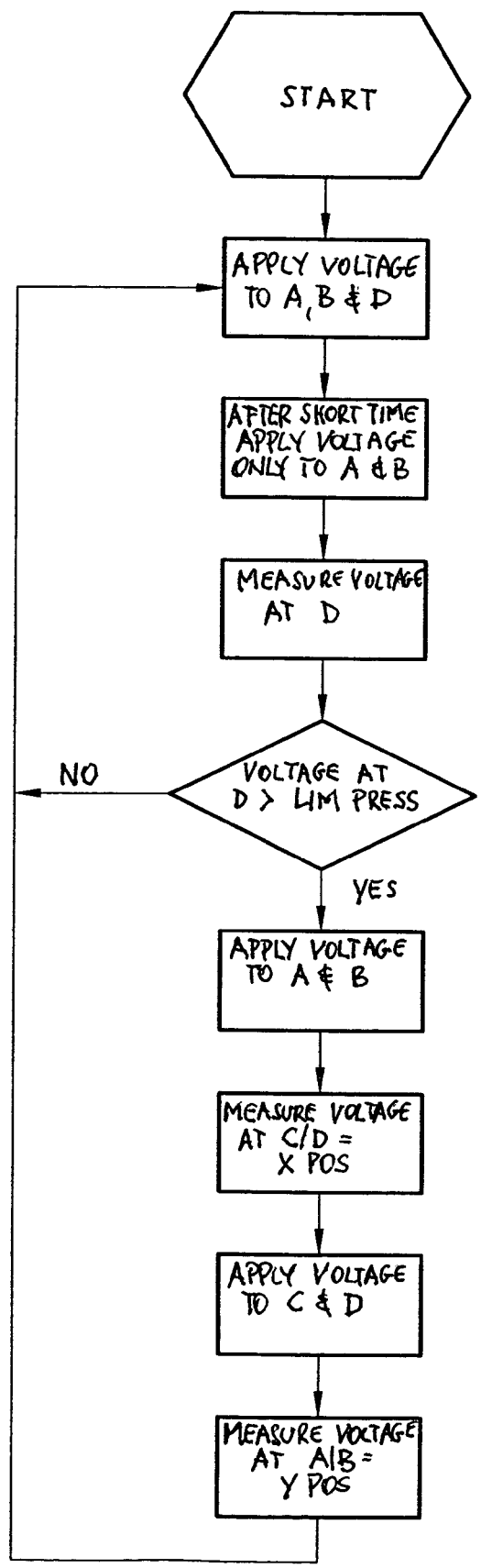
FIG. 4 is a flow diagram which illustrates the evaluation of the presence of a touch on a touch unit.

FIG. 4 illustrates a conventional method for determining the presence and position of a touch. Upon starting the measurement, a given voltage is applied to contact points A and B of measurement foil 1 at a rate of more than 200 such applications per second. A voltage is also applied to contact D of the other measurement foil 2 to subject the foil to a defined voltage level (0V). After a short time interval, the same voltage is again applied only to contacts A and B, and a resulting voltage is measured at contact D.

It means that no touch took place when the voltage at contact D is less than a given voltage value, or the voltage measured there does not exceed previously measured voltages. A voltage at contact point D that is larger than a given voltage or a previously measured voltage value means that a touch occurred, and the position of the touch is then appropriately calculated. For this, a given measurement voltage is applied between contacts A and B, and the resulting voltage between contacts C and D is measured. Based on the magnitude of the measured voltage, the X-position of the touch can be determined. A given measurement voltage is then applied to contacts C and D, and a resulting voltage between contacts A and B is measured. From that, the location of the touch in the Y-direction can be determined.

A disadvantage of this approach is that in the event of a double touch, that is, when two points on the touch unit are simultaneously pressed, it is only possible to determine the position of a virtual point at a location between the two actual contacts. It is not possible with this approach to determine that pressure was applied at two different locations.

Figure 5:
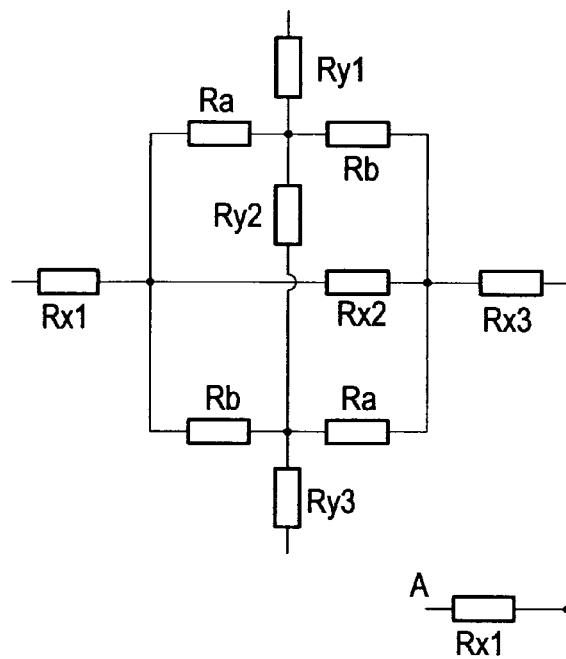
FIG. 5 is an electrical circuit diagram for a double touch.
Figure 6:
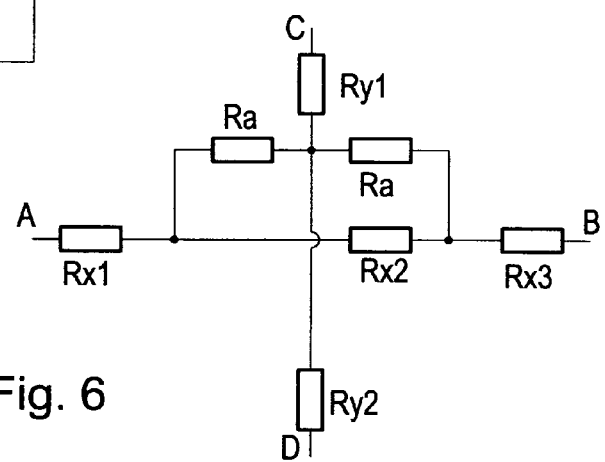
FIG. 6 is a simplified electrical circuit diagram.

FIG. 5 is a circuit diagram for determining double touches. It is assumed that RY2=0, that is, two pressure points lie on the X-axis. In that case, Ra=Rb. FIG. 6 is a circuit diagram which illustrates this simplified assumption. The result is that Ra=Rx2/2.

This demonstrates that in the X-direction the virtual middle point is determined. Under the assumption that A=5V and B=0V, the current is divided into equal parts by Rx2 and 2*Ra. This results in a voltage value between points C or D which is exactly in the middle between the two actual touch positions.

When a single touch is applied, the resistance is always constant. For example, if the measuring voltage is applied in the X-direction, then the resistance through which the measurement current must flow will always be Rx. However, if, for example, a double touch is applied along the X-axis, as shown above, a parallel circuit with two resistances which are also approximately of equal value is formed via Rx2. Rx2 is the resistance of the "X-foil", while the parallel resistance is formed on the "Y-foil". These parallel resistances Ra+Ra are determined by the two pressure points and also by the current.

As a result, the resistance of Rx changes.

Rx=R1+R2 for a single touch. (FIG. 2)

Rx=R1+(R2/2)+Rx3 for a double touch. That means the resistance decreases and, as a result, the current which flows between contacts A, B becomes larger. (FIG. 6)

The larger Rx2 is, and therewith the distance between the two pressure points, the larger the current becomes, because the total resistance decreases.

Figure 7:
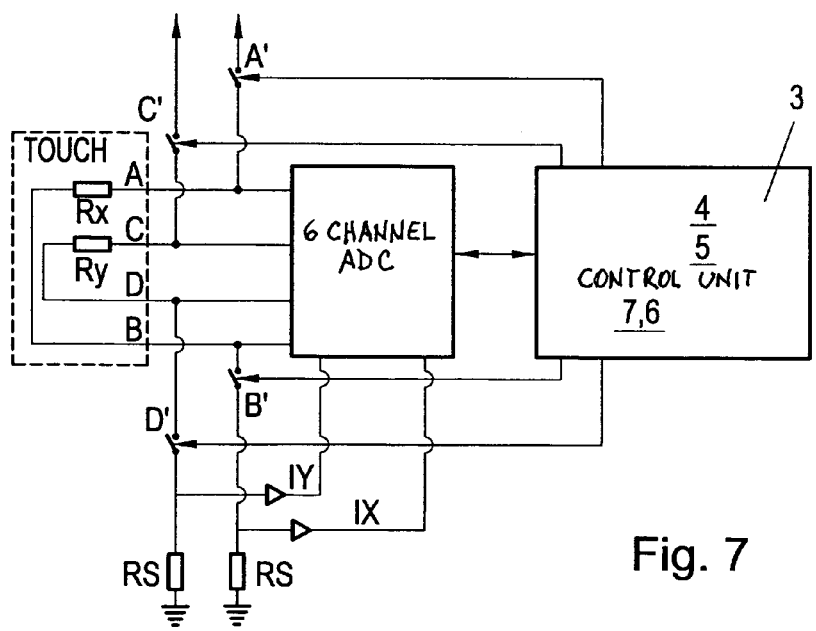
FIG. 7 schematically illustrates a touch unit made in accordance with the present invention for determining the occurrence of a double touch.

To detect a double touch, the current is additionally measured and compared with a current value that was measured beforehand or afterwards. If the difference exceeds a predetermined limit, a double touch occurred, and a corresponding signal can be generated. Since the current changes can sometimes be quite small when the touches of the double touch are close together, the current is measured in ADC channels, as is illustrated in FIG. 7.

Figure 8:
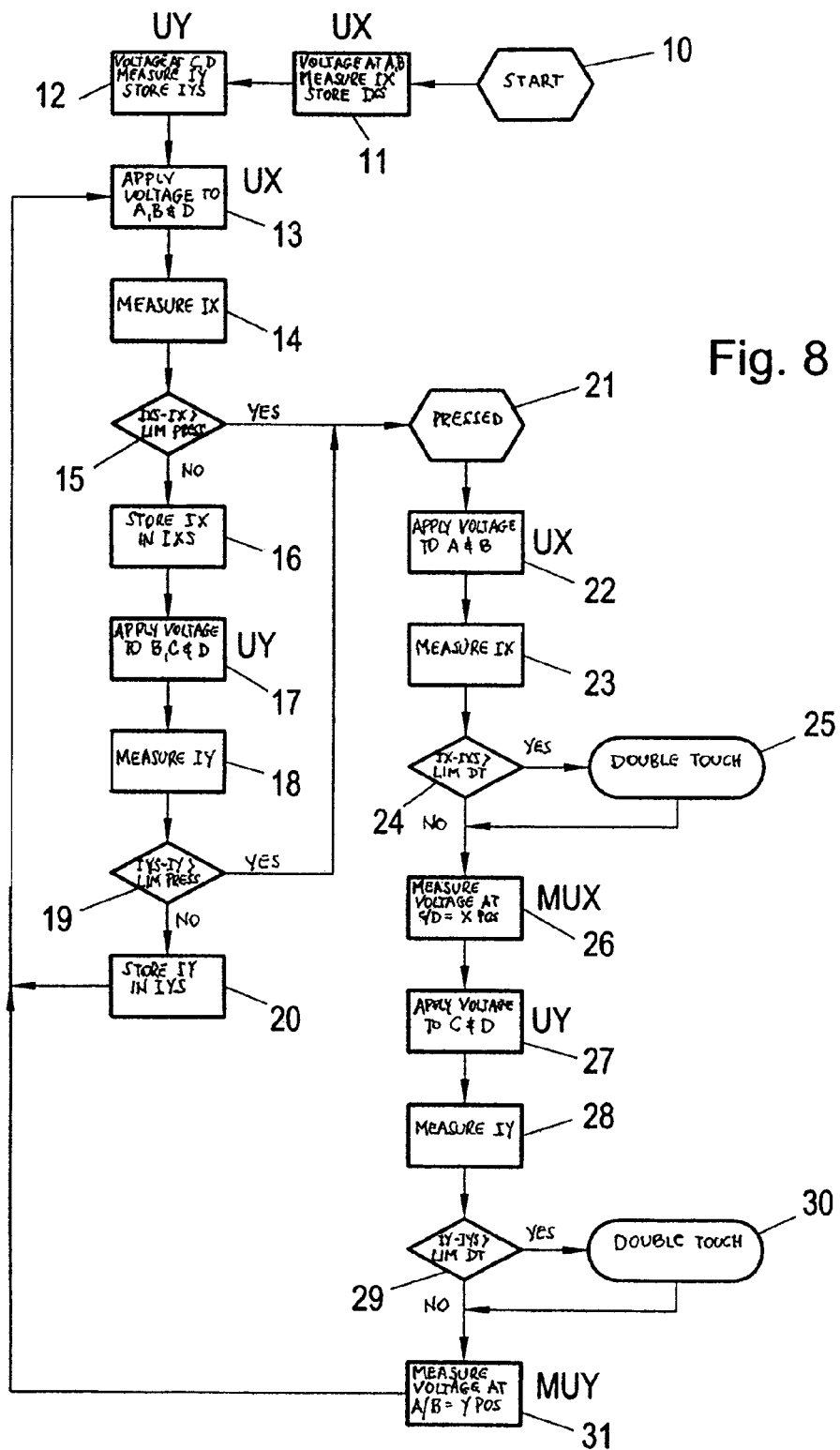
FIG. 8 is a flow diagram which illustrates the manner in which the method of the present invention is carried out.

FIG. 8 is a flow diagram which illustrates the present invention. The method is segmented into an initial determination if a touch has actually occurred, followed by checking whether a double touch occurred, followed by a position measurement for the touch in the event only a single touch occurred. These determinations are alternatively made for the two resistance foils 1, 2 so that corresponding X-direction and Y-direction determinations can be made. It is, however, also possible in accordance with the present invention to run the tests for only one of the resistance foils or in only one of the two directions. This is especially the case when double touches in which the two touches have the same X-position or the same Y-position can be precluded or tolerated. The sequence in which the control and measurements of the resistance foils occurs is optional. It is further possible in accordance with the invention to first measure a touch and afterwards determine if a double touch occurred and whether the resulting evaluation should be discarded. However, determining whether a double touch occurred prior to measuring the voltage and current in the resistance foils is preferred because it simplifies the construction of the device.

The method illustrated in FIG. 8 is repeated between 100 to 2,000 times a second. Due to the short time intervals available for applying the voltage and measuring the current, it is of relatively lesser significance in which sequence the required steps take place.

The following is an explanation of the individual steps performed in accordance with the method of the present invention.

Step 10: The measurement cycle starts.

Step 11: A given voltage UX is applied to contacts A, B of resistance foil 1, and the current IX flowing through resistance foil 1 is measured. The magnitude of this current is used during the subsequent measurements and is stored as the desired current IXS.

Step 12: A given voltage UY is applied to contact points C, D of resistance foil 2, and the resulting current in resistance foil 2 is measured. This actual current value IY can also be used as new desired current IYS and is comparable to Step 16.

The given voltages UX and UY correspond in magnitude to the voltages for determining whether a touch occurred or to check if there was a double touch. However, these voltages need not correspond to the measured voltages with which the position of a single touch is determined.

Step 13: To determine if a touch occurred at all, voltage UX is applied to contact points A, B. In addition, a voltage is applied to contact point D.

Step 14: The current IX flowing through resistance foil 1 between contact points A and B is measured.

Step 15: The initially measured desired current value IXS is compared with the current value IX measured in Step 14. If the difference between the desired current value IXS and the current value IX measured in Step 14 exceeds a desired minimum LimPress, it is assumed that a touch occurred, which is then fed to a touch sensing unit (see Step 21). When the check performed in Step 15 is unsuccessful, the measured current IX is stored as the new desired current value IXS in accordance with Step 16. In this manner, current flow differences resulting from resistance variations without any change in the voltage between points A and B, which can result, for example, from a temperature rise in the resistance foil, can be taken into account.

Step 17: Similar to Step 13, a voltage is applied to contact points B, C and D.

Step 18: The current IY between contact points B and C is measured.

Step 19: The desired current value IYS is compared with actual current IY measured in Step 18, and a determination is made if the resulting difference is larger than a given current value LimPress. If the difference is larger, it is judged that a touch occurred and will be taken into account in Step 21.

If the given difference LimPress is not reached,

Step 20 follows: The measured current value IY is stored as new desired current value IYS, and the method continues with Step 13. This means that no touch occurred; the checking of resistance foil 1 as well as of resistance foil 2, that is, a check of the X-position and the Y-position for a touch, yielded negative results.

However, if Steps 15 and 19 yielded a positive comparison, the presence of at least one positive comparison result is taken to mean that a touch occurred, which means pressure was applied to the touch unit.

Step 21: The results of the signals generated in Steps 15 and 19 are evaluated.

Step 22: A measurement voltage UX is applied to the contact points A and B of resistance foil 1.

Step 23: The actual current IX is measured when the measurement voltage UX is applied to resistance foil 1.

Step 24: The encountered actual current IX is compared to the desired current value IXS. If the difference is positive and greater than a given threshold value LimDT, this is evaluated in Step 25 that a double touch occurred.

If the threshold value is not reached, the process continues with

Step 26: The voltage at contacts C and D is measured and the voltage values are used to determine the X-position of the encountered touch.

Step 27: Similar to Step 22, the measurement voltage UY is applied to contacts C and D. It is noted that measurement voltages UX and UY need not have the same magnitude.

Step 28: The current IY flowing through resistance foil 2 between contact points C and D is measured.

Step 29: This flowing current IY is compared with the last stored desired current value IYS, and a determination is made if there is a positive difference between them that exceeds the given threshold value LimDT. When applicable in Step 30, the presence of a double touch is assumed. If the threshold value is not exceeded, it is followed by Step 31: In this step, the voltage encountered at connecting points A and B is measured and with it the Y-position of the encountered touch is determined in a manner analogous to Step 26.

When the occurrence of a double touch is encountered in Step 24 or Step 29, the measurement is terminated and the process begins anew with Step 13. Alternatively, the determination of the coordinates can continue.

If the occurrence of only one touch has been sensed and the position of the touch has been determined, following Step 31 the method returns to Step 13.

With the voltage values from Steps 26 and 31, the control and evaluation unit 3 determines the position of the touch on the touch unit.

FIG. 7 illustrates that the inlets to voltage-current measuring unit 7 are formed by a six-channel ADC, and they are connected between resistors RS and connection points B and D of the respective resistance foils 1 and 2. The required respective measurement elements and units for generating voltages and comparators are integrated in the control unit. This unit can be realized with hardware as well as with required software.

The accuracy of the method of the present invention can be enhanced by averaging the measured current and voltage values from several successive measurements and by then using the resulting averages for the process.

What is claimed is:

1. A method for evaluating touch signals applied to an analog resistive touch unit with first and second, spaced-apart resistance foils which have contacts (A, B and C, D respectively) at their respective opposing end zones arranged in perpendicular directions (X-direction, Y-direction) comprising the steps of:
   (a) applying a test voltage (UX, UY) to one resistance foil at a time,
   (b) measuring a current (IX, IY) through one resistance foil at a time, said current caused by said test voltage (UX, UY) being applied to the resistance foil, said measuring occurring if no touch has occurred,
   (c) storing the measured current per each foil as a desired current value (IXS, IYS),
   (d) after a determination that at least one touch occurred and after updating the desired current value (IXS, IYS), applying the test voltage to one resistance foil at a time,
   (e) measuring the actual current (IX, IY) in the resistance foil having the test voltage applied to it,
   (f) comparing said actual current (IX, IY) with the desired current value (IXS, IYS) for this resistance foil, and
   (g) in the event that the actual current (IX, IY) measured in at least one of the resistance foils is greater than the corresponding desired current value (IXS, IYS) for that foil, judging that a double touch occurred.

2. A method according to claim 1 including determining, especially prior to comparing the measured values for the actual current (IX, IY) with the stored desired current value (IXS, IYS), if a touch occurred at all by checking, after applying the measurement voltage (UX, UY) to one of the resistance foils, if the current (IX, IY) measured in the other resistance foils is smaller by a given value (LimPress) than the received desired current value (IXS, IYS), and, upon the occurrence thereof, judging that at least one touch occurred.

3. A method according to claim 1 including performing the current measurements and comparisons 100 to 2,000 times per second.

4. A method according to claim 3, wherein the current measurements and comparisons are performed 200 to 1,000 times per second.

5. A method according to claim 1, including digitizing the measured current values (IX, IY, IXS, IYS) and comparing the digitized current values.

6. A touch unit according to claim 1, wherein the actual current (IX, IY) measured in at least one of the resistance foils is greater than a given value (LimDT), judging that a double touch occurred.

7. A touch unit including a device for determining double touches comprising an analog resistive touch unit with first and second spaced-apart resistance foils which include contacts at respective end zones of the foils that are arranged perpendicular to each other (X-direction, Y-direction), comprising,
   at least one control and evaluation unit which includes a voltage-current measurement unit for the current flowing in one of the resistance foils at a time,
   the voltage-current measurement unit being adapted to measure the current (IX, IY) in one resistance foil at a time caused by applying a given test voltage (UX, UY) in one of the resistance foils,
   a storage device for receiving desired current values (IXS, IYS) measured per each resistance foil, and
   a comparator for comparing the actual current (IX, IY) with the desired current value (IXS, IYS) when the test voltage (UX, UY) is applied to the respective resistance foils one at a time,
   wherein it is judged that a double touch occurred when the resulting actual current (IX, IY) for a given resistance foil exceeds the desired current value (IXS, IYS) for that foil by a given value (LimDT).

8. A touch unit according to claim 7 including a further comparator for determining if at least one of the stored current values (IXS, IYS) exceeds one of the measured current values (IX, IY) by a given value (LimPress) and, if so, judging that a touch occurred.

9. A touch unit according to claim 7, wherein the at least one contact (B, D) of the resistance foils is attached to ground or a zero voltage via a resistor (RS).

10. A method for evaluating touch signals applied to an analog resistive touch unit with first and second resistance foils that are spaced-apart, comprising the steps of:
    (a) measuring a current (IX, IY) through one resistance foil at a time caused by a test voltage (UX, UY) being applied to the resistance foils one at a time,
    (b) storing the measured current as a desired current value (IXS, IYS),
    (c) after a determination that at least one touch occurred, applying the test voltage to one of the resistance foils, and measuring the actual current (IX, IY) in the other resistance foil (1, 2), and
    (d) comparing said actual current (IX, IY) with the desired current value (IXS, IYS) for the resistance foil to which the test voltage was applied to determine whether a double touch occurred and to calculate the location of touch.

* * * * *